United States Patent
Yatko et al.

(10) Patent No.: US 8,219,358 B2
(45) Date of Patent: Jul. 10, 2012

(54) PLATFORM MATCHING SYSTEMS AND METHODS

(75) Inventors: Steven W. Yatko, Upper Saddle River, NJ (US); Warren M. Pfeffer, Princeton, NJ (US); Killian D. Murphy, Brooklyn, NY (US)

(73) Assignee: Credit Suisse Securities (USA) LLC, New York, NY (US)

( * ) Notice: Subject to any disclaimer, the term of this patent is extended or adjusted under 35 U.S.C. 154(b) by 756 days.

(21) Appl. No.: 12/117,966

(22) Filed: May 9, 2008

(65) Prior Publication Data

US 2009/0281770 A1   Nov. 12, 2009

(51) Int. Cl.
*G21C 17/00* (2006.01)

(52) U.S. Cl. .......... 702/186; 702/123; 702/189

(58) Field of Classification Search .......... 702/123, 702/186, 189; 717/100–106, 120–124, 140, 717/203
See application file for complete search history.

(56) References Cited

U.S. PATENT DOCUMENTS

| | | | |
|---|---|---|---|
| 5,826,244 A | 10/1998 | Huberman | |
| 6,078,906 A | 6/2000 | Huberman | |
| 6,408,282 B1 | 6/2002 | Buist | |
| 6,480,861 B1 | 11/2002 | Kanevsky et al. | |
| 6,788,939 B2 | 9/2004 | Truong et al. | |
| 6,802,062 B1 | 10/2004 | Oyamada et al. | |
| 6,816,905 B1 | 11/2004 | Sheets et al. | |
| 6,901,446 B2 | 5/2005 | Chellis et al. | |
| 6,912,232 B1 | 6/2005 | Duffield et al. | |
| 6,947,987 B2 | 9/2005 | Boland | |
| 7,035,819 B1 | 4/2006 | Gianakouros et al. | |
| 7,054,943 B1 | 5/2006 | Goldszmidt et al. | |
| 7,113,924 B2 | 9/2006 | Fishbain | |
| 7,320,088 B1 | 1/2008 | Gawali | |
| 7,463,648 B1 | 12/2008 | Eppstein et al. | |
| 7,487,125 B2 | 2/2009 | Littlewood | |
| 7,532,999 B2 * | 5/2009 | Archie et al. | 702/179 |
| 7,539,640 B2 | 5/2009 | Burns et al. | |
| 7,567,929 B2 | 7/2009 | Kemp et al. | |
| 7,577,600 B1 | 8/2009 | Zagara et al. | |
| 7,580,946 B2 | 8/2009 | Mansour et al. | |
| 7,734,533 B2 | 6/2010 | Mackey et al. | |
| 7,788,632 B2 * | 8/2010 | Kuester et al. | 717/100 |
| 2002/0198815 A1 | 12/2002 | Greifeld et al. | |
| 2003/0041007 A1 | 2/2003 | Grey et al. | |

(Continued)

OTHER PUBLICATIONS

Buyya, Rajikumar, "Economic-based Distributed Resource Management and Scheduling for Grid Computing," Ph.D Thesis, Monash University, Melbourne, Australia; Apr. 12, 2002.

(Continued)

*Primary Examiner* — Mohamed Charioui
*Assistant Examiner* — Elias Desta
(74) *Attorney, Agent, or Firm* — Kenneth L. Johnson; Chadbourne & Parke LLP

(57) ABSTRACT

Pursuant to some embodiments, a platform matching system, method, apparatus and means are provided which include identifying at least a first benchmark test procedure to evaluate at least a first and a second target platform for use with an application, the at least first benchmark test procedure including at least a first unit test; receiving test result data from tests performed on the at least first and second target platform using the at least first benchmark test procedure; and performing a matching analysis to determine which of the at least first and second target platform is a best fit for the application.

16 Claims, 6 Drawing Sheets

U.S. PATENT DOCUMENTS

| | | |
|---|---|---|
| 2003/0050879 A1 | 3/2003 | Rosen et al. |
| 2003/0084018 A1 | 5/2003 | Chintalapati et al. |
| 2003/0084372 A1 | 5/2003 | Mock et al. |
| 2003/0093527 A1 | 5/2003 | Rolia |
| 2003/0101124 A1 | 5/2003 | Semret et al. |
| 2003/0101245 A1 | 5/2003 | Srinivasan et al. |
| 2003/0154112 A1 | 8/2003 | Nelman et al. |
| 2003/0233386 A1 | 12/2003 | Waki et al. |
| 2004/0010592 A1 | 1/2004 | Carver et al. |
| 2004/0044718 A1 | 3/2004 | Ferstl et al. |
| 2004/0111506 A1 | 6/2004 | Kundu et al. |
| 2004/0181476 A1 | 9/2004 | Smith et al. |
| 2004/0186905 A1 | 9/2004 | Young et al. |
| 2004/0205187 A1 | 10/2004 | Sayal et al. |
| 2004/0249743 A1 | 12/2004 | Virginas et al. |
| 2005/0038728 A1 | 2/2005 | La Mura |
| 2005/0044228 A1 | 2/2005 | Birkestrand et al. |
| 2005/0050545 A1 | 3/2005 | Moakley |
| 2005/0165925 A1 | 7/2005 | Dan et al. |
| 2005/0169202 A1 | 8/2005 | Ratasuk et al. |
| 2005/0172650 A1 | 8/2005 | Hermerding |
| 2005/0182838 A1 | 8/2005 | Sheets et al. |
| 2005/0188075 A1 | 8/2005 | Dias et al. |
| 2005/0246189 A1 | 11/2005 | Monitzer et al. |
| 2005/0262232 A1 | 11/2005 | Cuervo et al. |
| 2006/0047802 A1 | 3/2006 | Iszlai et al. |
| 2006/0064698 A1 | 3/2006 | Miller et al. |
| 2006/0069995 A1 | 3/2006 | Thompson et al. |
| 2006/0114926 A1 | 6/2006 | McKinnon et al. |
| 2006/0123217 A1 | 6/2006 | Burdick et al. |
| 2006/0143204 A1 | 6/2006 | Fish |
| 2006/0149576 A1 | 7/2006 | Ernest et al. |
| 2006/0167703 A1 | 7/2006 | Yakov |
| 2006/0190605 A1 | 8/2006 | Franz et al. |
| 2006/0235733 A1 | 10/2006 | Marks |
| 2007/0043860 A1 | 2/2007 | Pabari |
| 2007/0067435 A1 | 3/2007 | Landis et al. |
| 2007/0100735 A1 | 5/2007 | Kemp et al. |
| 2007/0234316 A1* | 10/2007 | Bayerlein ..................... 717/140 |
| 2007/0250433 A1 | 10/2007 | Bhat et al. |
| 2007/0260744 A1 | 11/2007 | Shenfield |
| 2008/0034360 A1* | 2/2008 | Bodin et al. ................. 717/154 |
| 2008/0126147 A1 | 5/2008 | Ang et al. |
| 2008/0244607 A1 | 10/2008 | Rysin et al. |
| 2009/0024512 A1 | 1/2009 | Reid |
| 2009/0119673 A1 | 5/2009 | Bubba |
| 2009/0228390 A1 | 9/2009 | Burns et al. |

OTHER PUBLICATIONS

Buyya et al. "A Case for Economy Grid Architecture for Service-Oriented Grid Computing," Proceedings of the 10th IEEE International Heterogeneous Computing Workshop (HCW 2001), in conjunction with IPDPS 2001, San Francisco, California, USA, Apr. 2001.

Buyya et al. "Economic Models for Management of Resources in Peer-to-Peer and Grid Computing," Technical Track on Commercial Applications for High-Performance Computing, SPIE International Symposium on the Convergence of Information Technologies and Communications (ITCom 2001), Aug. 20-24, 2001, Denver, Colorado, USA.

Joita et al. "A Double Auction Economic Model for Grid Services," Lecture Notes in Computer Science, vol. 3149/2004, pp. 409-416; Euro-Par 2004 Parallel Processing, 10th International Euro-Par Conference, Pisa, Italy, Aug. 31-Sep. 3, 2004.

Kant et al. "Double Auction Protocols for Resource Allocation in Grids," Proceedings of the IEEE International Conference on Information Technology: Coding and Computing (ITCC 2005), Apr. 11-13, 2005, Las Vegas, Nevada, USA; pp. 366-371.

Domingue, et al., Integrated Project Proposal, IST Call 1, FP7, BOSS: Boss Operation Services based on Semantics, Nov. 27, 2006, pp. 1-31.

Ward, et al., Fresco: A Web Services based Framework for Configuring Extensible SLA Management Systems, pp. 1-9.

* cited by examiner

Application / Resource Utilization Profile    Edit Profile

Selected Application               Weight Distribution

| ABC Application ▽ | Multi-Thread / Process | 5% |
| | Floating Point | 0% |

Margin of Error: 0%    Memory Intensive    50%
Integer Intensive    25%
Networking    20%

Platforms and Details    Show/Hide Details

Tested Platforms    Selected Platform(s) Detail

| Platform ABC |
| Platform DEF |
| Platform XYZ |
| Platform GHI |
| Platform QRS |
| ... |

Platform QRS: 8x Dual-Core AMD Opteron 2.8 GHz (cores1) / Memory: 39GB RAM – L2 1MB...

Hold down the control key while clicking to select more than one platform

Upload new platform XML files

Results (best fit with canonical weightings applied)    Show/Hide Menu

| DeSelect All | Clear All | Clear All Graphs | Show/Hide Test Descr. | Graph Selected |

☐ Multi-Thread/process (test1)    ☐ Integer Intensive (test1)
☐ Multi-Thread/process (test2)    ☐ Integer Intensive (test2)
☐ Memory Intensive (test1)    ☐ Floating Point (test1)
☐ Memory Intensive (test2)    ☐ Floating Point (test2)

PLATFORM MATCHING SYSTEMS AND METHODS

FIELD

The present invention relates to platform matching. In particular, the present invention relates to systems and methods to profile applications and benchmark platforms such that the applications may be matched to a most suitable computing platform.

BACKGROUND

Businesses and other entities are becoming increasingly dependent upon custom or semi-custom software applications to perform a variety of processing. For example, financial services businesses develop and utilize a wide range of applications to perform important activities, such as trade processing, decisioning, settlement, and the like. Each application may have different processing characteristics. For example, one application may be particularly dependent on database operations and may require use of a computing platform that has efficient memory and disk storage operation. Another application may be computation intensive, and require a computing platform that is suited for performing efficient floating point operations. As a result, different applications may perform differently on different hardware or computing platforms.

Advances in computing hardware and software are continuing at a rapid pace. This rapid advancement has provided a wide range of choices in computing platforms, with different operating systems, processors, storage devices, and memory configurations. A business or other entity may run custom or other software applications on a variety of computing platforms. Unfortunately, however, there is no "one size fits all" computing platform. An application requiring efficient floating point operations may not perform as well on a computing platform that is designed for efficient memory and disk storage applications. It is desirable to provide systems and methods to allow a business or other entity to select the computing platform (from among more than one available platforms) that is the best fit for a particular software application. It is desirable to provide systems and methods to match the processing requirements of applications to the performance results of one or more computing platforms to determine the best platform for an application. It is further desirable to monitor applications during operation and automatically generate application resource usage data for use in further matching each application to a most desirable computing platform.

BRIEF DESCRIPTION OF THE DRAWINGS

FIG. 6 is an illustration of a user interface according to some embodiments of the present invention.

DETAILED DESCRIPTION

Figure 1:
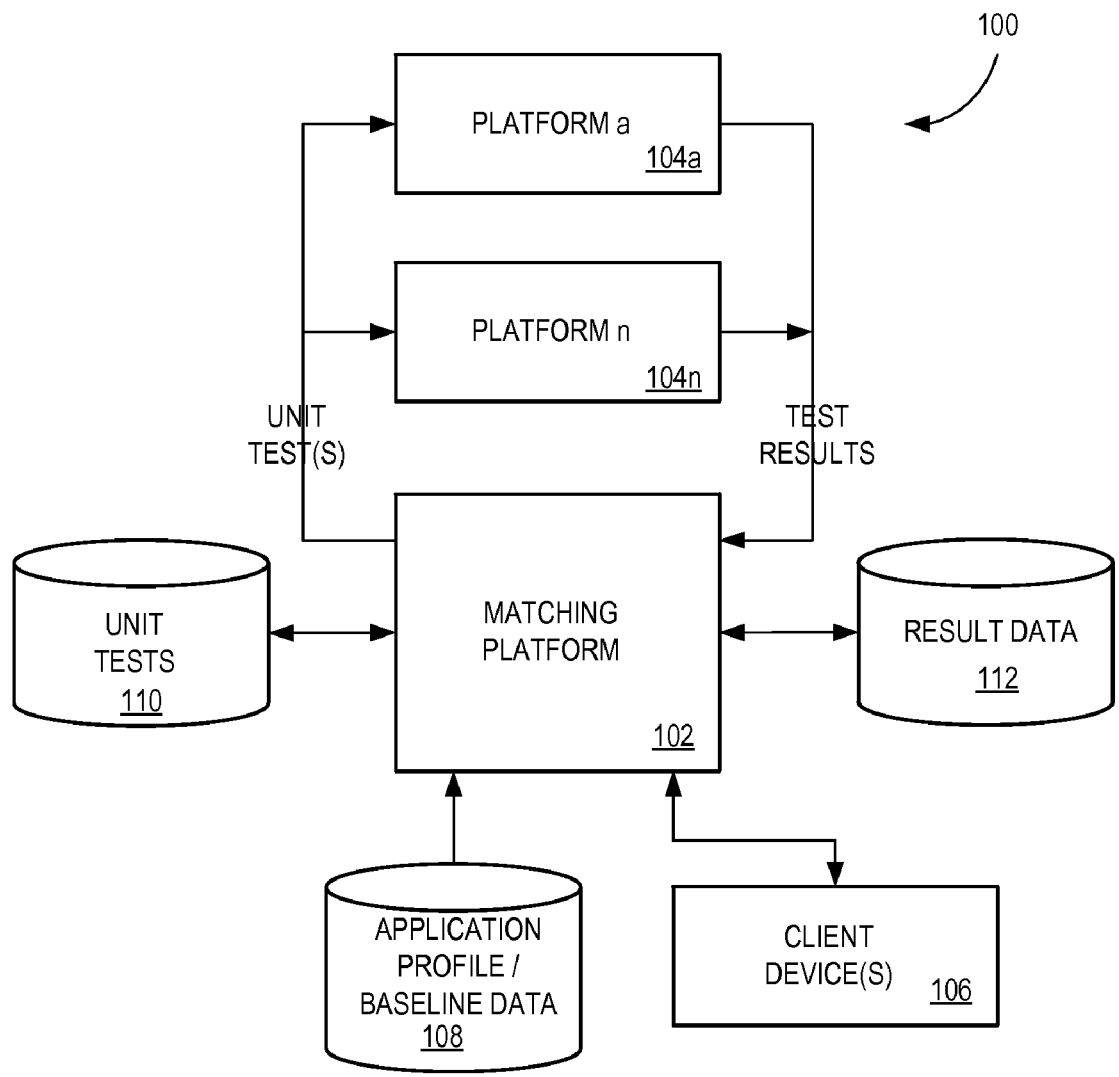
FIG. 1 is a block diagram overview of a system according to some embodiments of the present invention.

Applicants have recognized a need for an ability to match an application with the best fit computing platform from among more than one available computing platforms. Pursuant to some embodiments, a matching platform is provided to manage and administer this matching.

Some embodiments described herein are associated with platform matching systems and methods. As used herein, the phrase "software application" or "application" may refer to a software program (or related set of programs) coded (in any of a number of programming languages or techniques) to perform a desired set of services, tasks or operations on behalf of one or more users. The phrase "computing platform" may refer to computing hardware (including one or more processors, memory storage devices, input and output devices, etc.) and operating system software (such as Linux®, Unix, Windows®, or the like) packaged or integrated together so that software applications may be installed and operated on the computing platform.

As used herein, the term "services taxonomy" will refer to the description or characterization of each "service" performed by or utilized by an application. Put another way, as used herein, a "taxonomy" defines terminology associated with an application, and provides a coherent description of the components and conceptual structure of the computing platform requirements of the application. Each application has one or more "services", and each "service" has a service nature or taxonomy. Each service nature or taxonomy describes or categorizes the primary characteristics of a service. For example, a software application may be described as having one or more concrete service types, such as a database service and a data communication service. Each service may have characteristics other than hardware performance that may be considered. For example, characteristics such as HA capabilities, power consumption, failure rates, licensing costs, support costs, operational costs, and the like may also be considered and included in a given services taxonomy.

Further details of how these service descriptions are used pursuant to some embodiments will be described below. Those skilled in the art will appreciate that a number of services taxonomies may be followed or used in conjunction with some embodiments, including the "TOGAF Service Categories" available through the OpenGroup at http://www.opengroup.org. For example, an application taxonomy for a particular application may be shown as follows:

Database Management Service: 50%
    Memory Intensive: 15%
    Disk Intensive: 35%
    Network Intensive: 20%
    Integer Intensive: 30%
Network Service: 25%
    Memory Intensive: 20%
    Disk Intensive: 30%
    Network Intensive: 20%
    Integer Intensive: 30%
System and Network Management Service: 25%
    Memory Intensive: 25%
    Disk Intensive: 20%
    Network Intensive: 40%
    Integer Intensive: 15%

That is, the application taxonomy shown above is used to describe an application that is most heavily dependent upon database management services, and is particularly disk intensive in operation. Pursuant to some embodiments, this type of a description of the services profile of an application is used by the matching platform to analyze different computing platforms to identify the most appropriate platform for use with the application. Those skilled in the art will appreciate that other taxonomies and usage profile breakdowns may be used.

In general, pursuant to some embodiments, a platform matching process and system are provided in which an application is matched with a best (or most cost effective, or most desirable) computing platform by first generating a baseline performance dataset by testing the application using a known or benchmark computing platform. A resource usage profile is generated using a desired services taxonomy, and suitable benchmark unit tests are selected to evaluate each of the services in the taxonomy. In some embodiments, generating an accurate resource usage profile may require runtime analysis of an application's component services with software tools that can capture resource usage metrics from the baseline platform during testing. In some embodiments, for example if resource usage measurement tools are not available, then a resource usage profile can be generated manually based on expert knowledge of application behavior.

Each of the benchmark unit tests are then run on one or more target platforms to arrive at a benchmark result dataset. The matching platform then evaluates the benchmark result dataset by comparing the dataset to the resource usage profile to identify the computing platform that is the "best fit" (or most cost effective, or most desirable) computing platform. The result is a systemized, repeatable and efficient process and system for evaluating a plurality of computing platforms to select a computing platform that will produce the most desirable results when used with a particular software application. In this manner, embodiments allow businesses and other organizations to select the best computing platform (from a set of platforms under evaluation) for use with each software application, resulting in better application performance.

Features of some embodiments will now be described by first referring to FIG. 1, where a block diagram of some components of a platform matching system 100 pursuant to some embodiments is shown. As shown, platform matching system 100 includes a matching platform 102 in communication with a plurality of computing platforms 104*a-n*, one or more client devices 106, application profile and baseline data 108, unit tests 110, and result data 112. In general, matching platform 102 is used to control, administer, and analyze the overall matching process. Matching platform 102 may be configured as a computer server in communication with each of the other devices or systems using a communication network. As used herein, the phrase "communication network" may refer to, by way of example only, a Local Area Network (LAN), a Metropolitan Area Network (MAN), a Wide Area Network (WAN), a proprietary network, a wireless network, an Ethernet network, and/or an Internet Protocol (IP) network such as the Internet, an intranet, a direct (or wired) connection, and/or an extranet.

Matching platform 102 might comprise, for example, one or more personal computers, servers or the like. Although a single matching platform 102 is illustrated in FIG. 1, a plurality of platforms might be provided.

Matching platform 102 is in communication with one or more client devices 106 which may comprise, for example, networked computers in communication with matching platform 102 and used by, for example, end users who use each client device 106 to interact with matching platform 102. For example, client device 106 may be operated by a technician who wishes to evaluate a number of target platforms 104 for use with a software application. The technician may interact with the matching platform 102 through the client device 106. For example, the technician may use the client device 106 to specify a services taxonomy for the software application, and then use the client device 106 to control or establish a benchmark test sequence performed on a benchmark platform. The technician may then use the client device 106 to select a set of benchmark unit tests to be run on each of the target platforms 104, and then use the device to manage or administer the running of each of the benchmark unit tests on each of the target platforms 104. After all of the benchmark unit tests have been performed, the technician may use the client device 106 to run a "best fit" analysis of each of the target platforms to identify the target platform 104 that is the best or most appropriate platform to use with the software application under evaluation. Further details of this process will be provided below.

As shown in FIG. 1, matching platform 102 is in communication with a number of data stores, including, for example, unit test data 110, result data 112, and application profile/baseline data 108. Some or all of these data stores may include data stored in a structured database, such as an XQuery capable database (where the data is stored in one or more XML files), although those skilled in the art will appreciate that other storage techniques and structures may also be used. Details of the data stored in some embodiments will be described further below.

To illustrate features of some embodiments, an example will now be provided. This illustrative example will be referenced throughout the remainder of this description. Those skilled in the art will appreciate that this example is illustrative but not limiting—other specific applications, platforms, and tests may be used with, and are within the scope of, embodiments of the present invention. In the illustrative example, a technician is tasked with the responsibility of evaluating two potential target platforms for use as the "production" or live computing platform to run or operate a financial services software application. The technician is responsible for selecting which of the two target platforms is best suited for use with the software application. The two target platforms are:

(1) A System ABC computing platform (referred to in the example as the "ABC" platform); and
(2) A System DEF computing platform (referred to in the example as the "DEF" platform).

In the illustrative example, the software application is referred to as the "ABC application". The ABC application is a financial services software application that is primarily a database application and that will be used by a number of users on a network. The processing that may occur, pursuant to some embodiments, to match an application (such as the ABC application, in the example) to a most desirable, or most suitable (or "best fit") computing platform will now be described by first referring to FIG. 2 where a flow diagram of an overview of a platform matching process is provided. The flow charts described herein do not imply a fixed order to the steps, and embodiments of the present invention may be practiced in any order that is practicable. The process of FIG. may be performed, for example, using the matching system 100 of FIG. 1.

Figure 2:
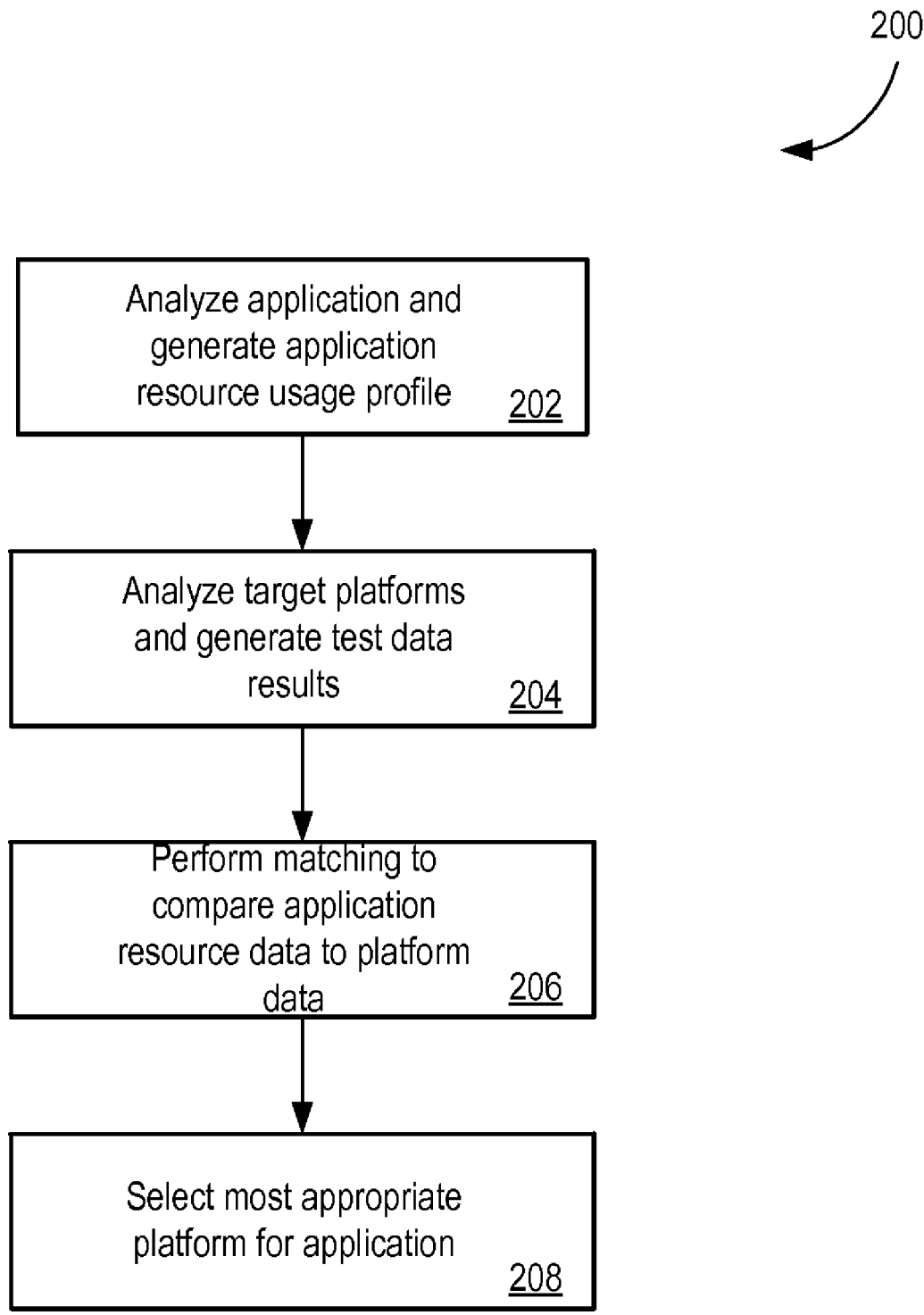
FIG. 2 is a flow chart of a method according to some embodiments of the present invention.

Processing of FIG. 2 begins at 202 where an application to be matched to a computing platform is analyzed. Pursuant to some embodiments, an application is analyzed to measure its application resource usage profile by measuring, monitoring, and manipulating selected resource metrics. The application resource usage profile data is expressed as a percentage of overall application resource consumption of the application. For example (and as will be described in further detail below), processing at 202 includes determining which resources are used during runtime of an application, and a relative weight of usage of that resource. As a specific illustrative example, memory usage will be expressed as the time that is spent accessing memory during runtime divided by the total application runtime. As another specific illustrative example, integer intensive operations will be expressed as the time that is spent performing integer intensive processing during runtime divided by the total application runtime. The result is an application resource usage profile that identifies the relative weightings of application resource usage for an application (e.g., an application may then be described as being 50% memory intensive, etc.). The resulting application resource usage profile data is stored for each application for later use.

Processing continues at 204 where one or more target platforms are analyzed to create data identifying their performance characteristics. Processing at 204 may be performed separately from the processing at 202 so that a separate data store of platform data may be available for matching operations. Platform data may be created by performing a variety of benchmark unit tests on each platform and storing the results in a data store for access by the platform matching system.

Processing continues at 206 where a matching process (described further below) is performed to compare the application resource usage profile data with performance data from one or more available target platforms to identify which platform(s) are most suited to the application. In this way, applications may be matched to the best (or most desirable) computing platform, resulting in increased performance, cost savings or efficiency. Pursuant to some embodiments, processing at 206 is performed using matching platform 102 of FIG. 1. At 208, an operator interacting with matching platform 102 may select from the most desirable platforms to pick the target platform to be used with the application. In this manner, an application can be matched to a best or most suitable platform in an efficient and repeatable manner.

Figure 3:
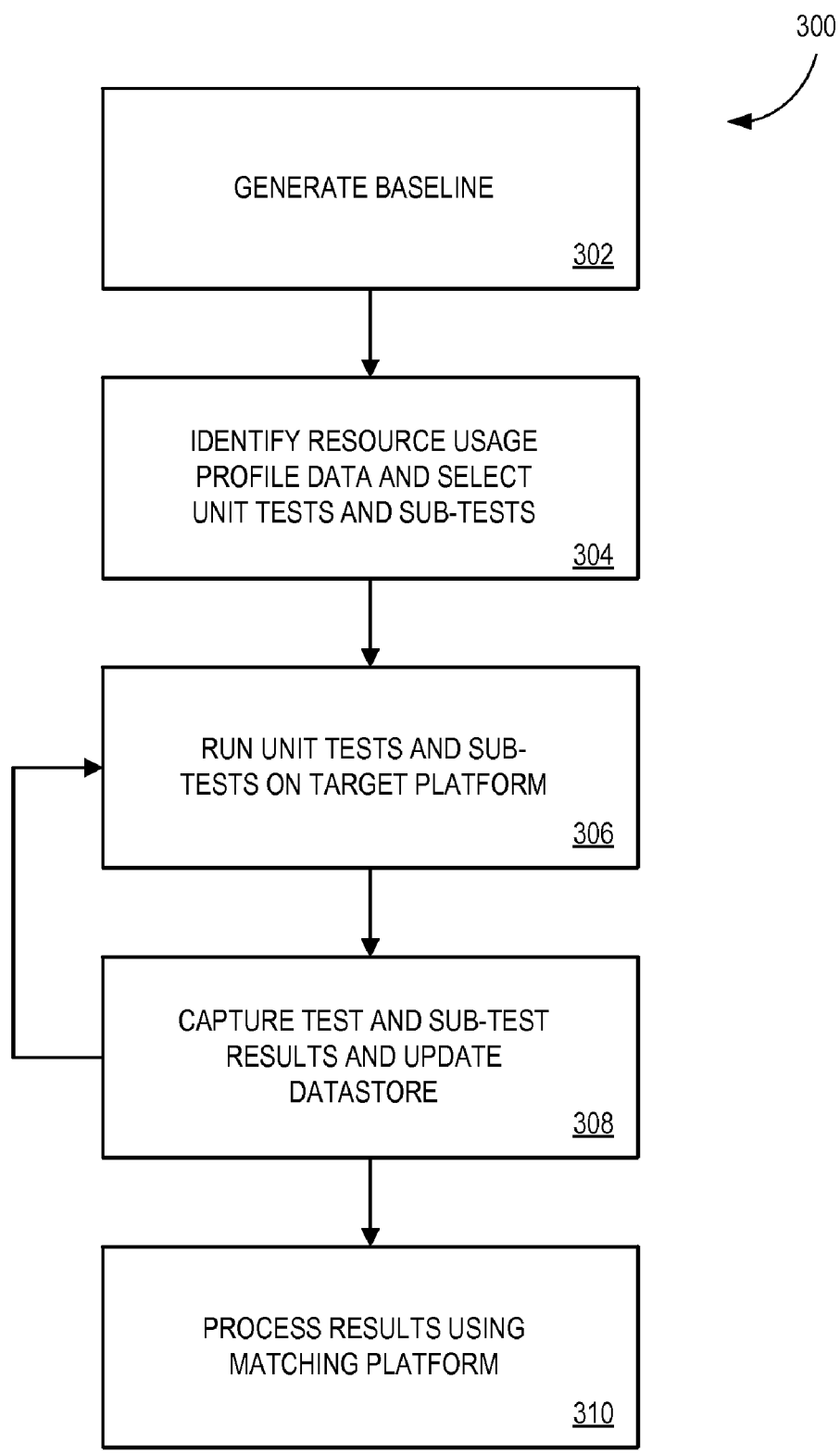
FIG. 3 is a further flow chart of a method according to some embodiments of the present invention.

Further details of the processing to match a target platform to an application will now be described by reference to FIG. 3. FIG. 3 is a flow chart of a platform matching process according to some embodiments of the present invention.

According to some embodiments, some or all of the steps of FIG. 3 may be directed or managed by a user interacting with a matching platform (such as platform 102 of FIG. 1) via a client device (such as device 106 of FIG. 1). Instructions and commands may be input by the user into a Graphical User Interface (GUI) display associated with the client device to interact with a matching application operated under the control of the matching platform.

Pursuant to some embodiments, the user begins the process of FIG. 3 with several pieces of information—knowledge of the software application, and knowledge of the available computing platforms to be evaluated. For example, the user may be a technician or developer who understands the general design and operation of the software application, as well as the set of computing platforms to be evaluated. Continuing the illustrative example introduced above, the technician may begin the process of FIG. 3 knowing that the ABC application is a financial services software application that is primarily a database application that will be used on a network, and that the ABC and DEF platforms are to be evaluated.

Processing begins at 302, where the user generates a baseline set of data to begin the matching process. In some embodiments, the baseline set of data is obtained by running the software application on a known computing platform, and monitoring the resource usage characteristics of the software application. For example, a test hardware configuration may be used that is in communication with the matching platform. The baseline set of data may, for example, include the capture and storage of resource usage characteristics such as: database usage characteristics, data communication characteristics, system and network management characteristics, and the like. These characteristics may be measured using a set of standard benchmark tests designed to test each of the various characteristics.

Processing continues at 304 where a user interacts with the matching system to identify resource usage profile data and select a set of appropriate benchmark unit tests to evaluate the identified resources. In some embodiments, an objective is to measure the application resource usage of various system resources and express the application behavior profile as a breakdown by percentage of resources utilized. Applicants have recognized that one challenge is to translate the recorded resource metrics (which are often expressed as a consumption rate such as a disk write expressed as a bits per second throughput metric) into a form that can be expressed as a percentage of overall application resource consumption which is composed of disparate types of resources each with their own unit of measurement. Its not enough to know the throughput of a resources; instead, embodiments correlate the throughput to the amount of time the application spends accessing the resource. For example, an application may be doing 50k bps writes, but if the disk write portion of a 10 minute application runtime is only 10 seconds long, then the disk write operation is only a small percentage of the application resource usage profile.

For example, in the illustrative example, the technician may identify that the ABC application has the following baseline resource usage profile, and with the following canonical form weightings:

Multithreaded/Multiprocess: 5%
Floating Point: 0%;
Memory Intensive: 50%;
Integer Intensive: 25%;
Networking: 20%

That is, the technician, based on baseline testing of the application on a known platform, has identified that the ABC application is comprised of services that are heavily dependent upon memory operations (with 50% of the canonical form weightings going toward how a platform performs in memory intensive operations), and is less dependent upon multithreaded and multiprocess services and floating point operation services.

This baseline resource usage profile will be used by the matching platform to analyze different computing platforms to identify the most appropriate platform for use with the ABC application. Those skilled in the art will appreciate that other taxonomies and usage profile breakdowns may be used. Pursuant to some embodiments, processing at 304 includes storing the baseline resource usage profile in a datastore accessible by the matching platform (e.g., such as in datastore 108 in FIG. 1).

Those skilled in the art will appreciate that this baseline resource usage profile may be expressed in a number of ways. In one example embodiment, the baseline resource usage profile is expressed quantitatively so that it can fit into a ranking system (which will be described further below). In the example, based on the baseline resource usage profile established by the technician, the ABC and DEF computing platforms will be tested and evaluated and then ranked with the memory intensive service test results receiving a weight of 50%, the integer intensive service test results receiving a weight of 25%, etc.

Processing at 304 further includes the selection of individual benchmark unit tests to test each of the services identified as of importance to analysis of the application. Those skilled in the art will appreciate that a number of benchmark unit test procedures are available to test different resource usage characteristics. In some embodiments, the matching system may access or use data from a datastore (such as datastore 110 of FIG. 1) to access information about available unit tests. For example, datastore 110 may store a library of available benchmark unit tests.

In one example embodiment, data may be stored in a structured manner, by using, for example, a relational database or as XML files in an XQuery capable database. In this manner, data from individual unit tests and matching processes may easily be stored, accessed, and manipulated by the matching platform.

Continuing the illustrative example introduced above, in the example, processing at 304 may include the technician selecting baseline unit tests that are appropriate for testing a platform's multithreaded/multiprocess, floating point, memory intensive, integer intensive, and networking services. The technician may select one or more unit test procedures to test each characteristic. As a specific illustrative example, the technician has selected the following unit test procedures to perform on each target computing platform:

| Unit Test Name | Canonical Form |
| --- | --- |
| ACE_QBW | Multithreaded/Multiprocess |
| ACE_TCP | Networking |
| MPB | Multithreaded/Multiprocess |
| PB | Multithreaded/Multiprocess |
| STREAMS | Memory Intensive |

Those skilled in the art will appreciate that a wide range of different unit test procedures are available, and that selection of a desired unit test procedure to test a particular service is within the skill of the person of ordinary skill in the art. The above unit test procedures are identified for illustrative purposes only.

Once the technician has selected a set of unit test procedures to test each of the target platforms, processing continues at 306, where each of the selected unit test procedures are run on each of the target platforms.

Processing continues at 308 where the result data for each of the unit test procedures for each of the target platforms is captured and stored. For example, the unit test data may be stored in datastore 110 of FIG. 1 so that it is readily accessible by matching platform 102 for analysis. In some embodiments, each test may be run multiple times (e.g., there may be multiple sub-tests within each unit test). For example, a unit test may be run with different parameters to identify different performance characteristics of the platform under test. As used herein, the results from each of these sub-tests is referred to as a separate "Y-value" in the unit test results. The test result data from each unit test is stored in a structured manner so that each Y-value result may be identified and compared by the matching platform. Again, in some embodiments, the data is stored in XML format.

Processing at 306 and 308 is repeated until all of the selected unit tests have been performed on each of the target platforms and all of the result data has been stored in a data store for analysis by the matching platform.

For example, continuing the illustrative example introduced above, processing at 306 and 308 includes performing the ACE_QBW, ACE_TCP, MPB, PB and STREAMS unit test procedures on each of the ABC and DEF platforms. Each of the unit tests are repeated for each Y-value, until a complete dataset representing the full test results for each platform is obtained. In the illustrative example, the unit test results are stored as XML files in an XQuery capable database. The XML may be stored or accessed using the following general format:

<benchmark test name>|<system configuration tested>|<y-value>

As a result, at the completion of the processing at 306 and 308, in the illustrative example, a data array or table is constructed which has data identifying each unit test for each tested platform, and at each Y-value (or sub test). Those skilled in the art will recognize that other data storage and formatting techniques may be used so long as the data for each test and each platform are readily accessible.

Figure 4:
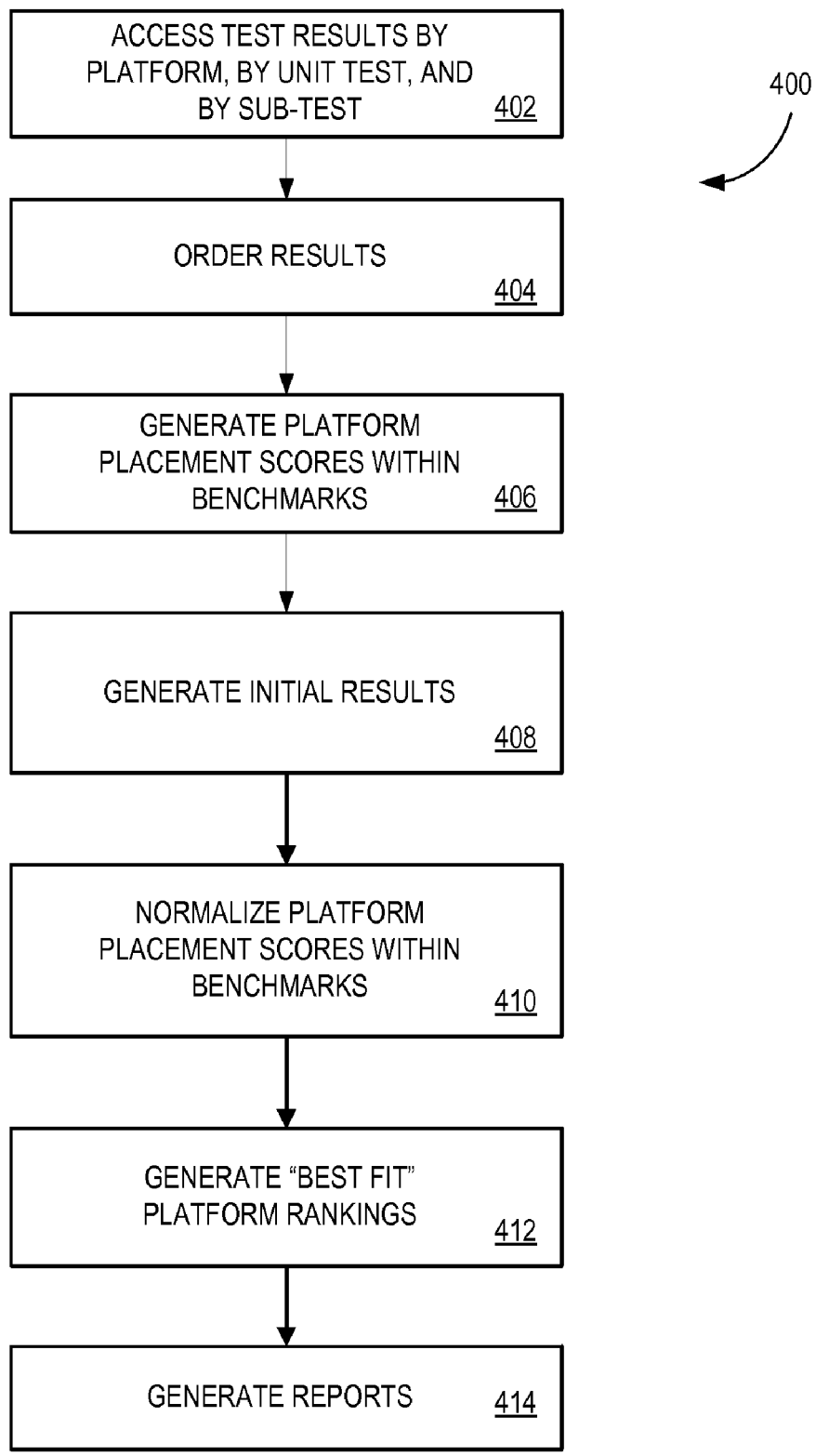
FIG. 4 is a further flow chart of a method according to some embodiments of the present invention.

Processing continues at 310 where the matching platform (such as matching platform 102 of FIG. 1) accesses the result data and analyzes the data to identify the platform that is the best fit or match for the software application. Further details of the processing at 310 will now be described in conjunction with FIG. 4. FIG. 4 depicts a process 400 for analyzing data to identify the most appropriate platform (or the "best fit") for a particular software application. Process 400 may be performed by a matching platform such as platform 102 of FIG. 1. For example, process 400 may be initiated by a user interacting with a client device in communication with the matching platform. The matching platform may perform process 400 by executing computer program code configured to perform the process steps of process 400.

As a specific illustrative example, the matching platform stores PHP code which, when executed, performs one or more of the steps of process 400. Process 400 begins at 402 where the matching platform accesses the test result data, for each platform, each unit test, and each subtest. As discussed above, in some embodiments, the data is stored as an XML file in an XSD database. In such an embodiment, the processing at 402 includes retrieving the data by an XQuery. Processing at 402 may include creating an object having an array of the result data. For example, the array for the testing done in the illustrative example introduced above may include an array[0]-array[x] having array data including the unit test name (such as "ACE_QBW"), the system configuration tested (such as "ABC"), and a number of Y-values, representing the unit test results for each Y-value or subtest.

In some embodiments, processing continues at 404 where the object (including the XQuery results) is then re-ordered into a tree structure that associates the Y-values to the system configurations tested, grouped within the particular unit benchmark test. This allows the matching system to then numerically sort within the Y-value data to determine a score for each platform within each subtest. In some embodiments, the resulting score within each subtest will be in ascending order, while in other embodiments the score will be in descending order (depending upon the particular benchmark, and whether the benchmark results are to be ranked in ascending, i.e. throughput, or descending order, i.e. latency). For example, again continuing the illustrative example, the result of processing at 404 may be an array that ranks the ABC and DEF platforms by their performance in each subunit test within each unit test. Example result data is shown below in TABLE 1 to facilitate understanding of some embodiments:

TABLE 1

Unit Test: STREAMS

| Y-Value | Y-Value Result | Platform |
|---------|----------------|----------|
| Y1 | 1846.1567 | ABC |
|  | 2250.0021 | DEF |
| Y2 | 1846.1567 | ABC |
|  | 2181.8187 | DEF |
| Y3 | 2000.0037 | ABC |
|  | 2511.8187 | DEF |
| Y4 | 2000.0037 | ABC |
|  | 2400.0061 | DEF |

As shown, in the STREAMS unit tests, the DEF system performed better than the ABC system in the subunit tests labeled Y1-Y4 (as STREAMS is a throughput test, higher values are better). Those skilled in the art will appreciate that for some benchmark unit tests, a large number of Y-values or subtests may be performed. Processing pursuant to some embodiments involves sorting each of the Y-value results for each unit test so that a ranking may be determined by the matching platform. Similar sorts are performed for each of the unit tests so that a resulting data structure is created that has unit test data with all Y-values and Y-value results for each of the platforms sorted within each Y-value.

Processing continues at 406 where the matching platform operates on the data structures created at 404 to generate platform placement scores within each benchmark unit test. In some embodiments these scores are calculated by having the post-sorted array index values (created in 404) represent the finishing order of a system within a test. For example, in the STREAMS array illustrated above, the ABC system had the top ranking Y-value results for subtests Y1-Y4, and would have an overall platform placement score of "4" (assuming, for simplicity, that there were no other Y-values). Similarly, the DEF system would have an overall platform placement score of "8" because it finished in second index position in each of the four unit subtests. In some embodiments, Y-values for an identical test between two or more platforms may be considered of equal performance if they do not differ by more than a pre-specified margin of error. This optional margin of error value can be specified by the user at a global level (wherein it would apply to all test comparisons), or on a per test basis.

Processing continues at 408 where, in some embodiments, the data structure from 406 is transformed into a results data structure representing the scores for each benchmark unit test, by platform. For example, the results data structure for the illustrative example may generally appear as shown below in TABLE 2:

TABLE 2

"ABC Application" Results Data

| Benchmark Unit Test | Platform | Score |
|---------------------|----------|-------|
| ACE_QBW | ABC | 50 |
|  | DEF | 40 |
| ACE_TCP | ABC | 2 |
|  | DEF | 4 |
| MPB | ABC | 9 |
|  | DEF | 9 |
| PB | ABC | 6 |
|  | DEF | 6 |
| STREAMS | ABC | 4 |
|  | DEF | 8 |

The results data structure is generated, for example, by taking the post-sorted subunit test results generated in 406, and creating a data structure containing all of the results.

Processing continues at 410 where the platform placement scores are normalized within each benchmark unit test. For example, this may be performed to assign a familiar (or human-readable) placement score, such as "1" for "first place", "2" for "second place", etc. A "tie" may be signified by two equal normalized results. These normalized scores may also be stored in a data structure for later analysis and viewing. An illustrative data structure is shown below in TABLE 3:

TABLE 3

"ABC Application" Results Data

| Benchmark Unit Test | Platform | Normalized Results |
|---------------------|----------|--------------------|
| ACE_QBW | ABC | 1 |
|  | DEF | 2 |
| ACE_TCP | ABC | 1 |
|  | DEF | 2 |
| MPB | ABC | 1 |
|  | DEF | 1 |
| PB | ABC | 1 |
|  | DEF | 1 |
| STREAMS | ABC | 1 |
|  | DEF | 2 |

Processing continues at 412 where the matching platform operates on the data generated above to arrive at a "best fit" or best match platform ranking. For example, the matching platform may multiply the value that represents the percentage of relevance (the weighting) of each service in the taxonomy, to the normalized placement scores (generated at 410). These may be stored in a further data structure. For example, continuing the illustrative example, at the beginning of the matching process the technician determined that the application profile of the ABC application and their relative weightings was as follows:

Multithreaded/Multiprocess: 5%
Floating Point: 0%
Memory Intensive: 50%
Integer Intensive: 25%
Networking: 20%

Since there were three Multithreaded/Multiprocess unit tests selected and performed on each of the platforms, the technician may choose to distribute the 5% weighting of the Multithreaded/Multiprocess service evenly among the three unit tests (although different distributions may be selected). As such, the weightings for each of the unit tests performed in the illustrative example may be:

ACE_QBW: 1.66%
MPB: 1.66%
PB: 1.66%
STREAMS: 50%
ACE_TCP: 25%

In this illustrative example, no Integer Intensive unit tests were performed, so the total weightings allocation for the unit tests does not total 100%. In some embodiments, processing at 412 includes applying the weighting allocations (shown above for the illustrative example) to the normalized rankings (shown in TABLE 3 for the illustrative example) generated at 410. Pursuant to some embodiments, the resulting rankings may again be normalized to familiar placement rankings (e.g., with "1" for first place, etc.). In the illustrative example, the DEF system is the "best fit" platform for the ABC application, with an overall placement score of "74". The ABC system is the second place platform, with an overall placement score of "143".

Pursuant to some embodiments, different systems can be readily compared even a variety of different benchmark tests are performed which have different meanings (e.g., a value of a Floating Point test is expressed in MFlops, and a value of a Network test may be expressed in terms of throughput or latency). The result is a system that allows different computing platforms to be compared in a meaningful way to identify the platform (or platforms) that are best suited for use in conjunction with a particular software application. Further, pursuant to some embodiments, the comparison of the platforms can be performed using an automated, or partially automated, matching platform, allowing rapid and accurate comparisons.

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Pursuant to some embodiments, a matching platform (such as the platform 102 of FIG. 1), may automatically analyze a particular software application to generate accurate canonical form weightings for the application. In some embodiments, the canonical form weightings may be generated manually by a technician operating or interacting with the matching platform. In some embodiments, a matching platform (such as the platform 102) is configured to monitor (or receive monitoring data) a variety of applications in their production environments during their normal operation to continually receive and update application resource usage data. In some embodiments, this data may be used to reallocate computing resources, make new platform purchase or allocation decisions, monitor service level agreements, monitor budget and capacity, or the like.

Figure 5:
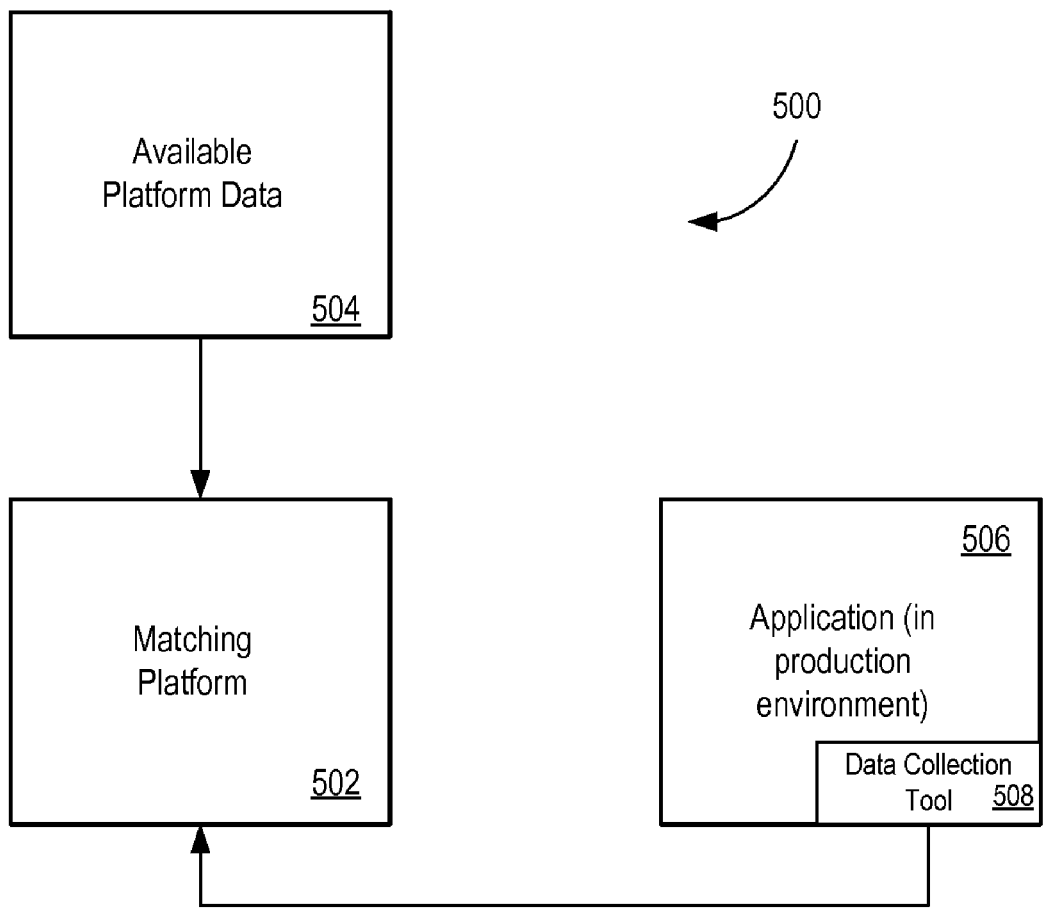
FIG. 5 is a block diagram of a system according to some embodiments of the present invention.

For example, referring to FIG. 5, a system 500 is shown which receives application resource usage data from applications in a production environment. As shown, matching platform 502 is in communication with an application 506 deployed in a production environment. While only a single production application is shown, a number of applications may be monitored. Application resource usage data is captured by a data collection tool 508 which monitors selected application resource usage data of the application and transmits the data back to platform matching system 502. Matching platform 502 may use this data to make updated "best fit" recommendations (e.g., by matching the updated application resource usage data to a set of available platforms 504). In some embodiments, matching platform 502 may also use the updated application resource data to monitor service level agreement commitments, changes in application resource usage, and other performance data. The data can be used to reallocate resources, deploy new applications and platforms, or the like.

Users and administrators may interact with matching platform 102 of FIG. 1 via one or more client device(s) 106 using a graphical user interface such as the graphical user interface 600 of FIG. 6. Pursuant to some embodiments, users may interact with matching platform 102 by pointing a Web browser associated with a client device 106 to an Internet address (such as a secure site) associated with the matching platform 102. While a wide variety of user interface designs may be used, one suitable design is depicted in FIG. 6. As shown, a user screen is presented which includes a top portion in which a user can select an application for analysis. When an application is selected, details of the application resource usage profile associated with that application are shown. A user may also be provided with sufficient permissions to edit the profile of a selected application.

A second portion of the illustrative user interface includes a region for selecting one or more target platforms to analyze the suitability of a match between the selected application and the selected target platforms. Details of each of the selected target platforms may be shown, and a user with sufficient permissions may be able to upload an XML file (or other suitable file format) having details of a new or updated target platform.

A third portion of the illustrative user interface includes a region for viewing data showing how well each of the selected target platforms fit the selected application. A number of options may be selected or deselected by a user to view various charts or descriptions relating to the match of the selected platforms to the application. In this way, a user operating a client device may efficiently and easily interact with matching platform 102 to view, analyze, update and edit information associated with an application and one or more platforms. The result is an ability to easily select the platform or platforms that are best suited to a given application.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims. For example, while some embodiments have been described in which an application's resource utilization profile is created by a technician who has in-depth knowledge of an application's behavior, other embodiments create a resource utilization profile using a model derived from measurements obtained via performance analysis tools. Further, while an application's resource utilization profile has been described in terms of technical characteristics (such as whether/how much an application is disk intensive, memory intensive, network intensive, etc.), those skilled in the art will now appreciate that an application's profile may be described in terms of other characteristics such as system redundancy features, operational costs, etc.

Further, while the use of XML schemas to represent both an application's resource utilization profile and a platform's description and test results, those skilled in the art will recognize that other schemas may be used.

What is claimed:

1. A method, comprising:
   identifying, by a processor, at least a first benchmark test procedure to evaluate at least a first and a second target platform for use with an application, said at least first benchmark test procedure including at least a first unit test;
   receiving by a communication device test result data from tests performed on said at least first and second target platform using said at least first benchmark test procedure; and
   performing, by said processor, a matching analysis to determine which of said at least first and second target platform is a best fit for said application;
   wherein said identifying, by the processor, at least a first benchmark test procedure further includes generating an application resource usage profile associated with the application;

wherein said application resource usage profile includes a plurality of canonical forms, each canonical form associated with a relevance weighting;

wherein said plurality of canonical forms include at least one canonical form selected from the group consisting off multithreaded, networking, floating point, memory intensive, integer intensive, and I/O disk processing.

2. The method of claim 1, wherein said application resource usage profile includes at least one canonical form associated with the application.

3. The method of claim 1, wherein the benchmark test procedure is selected from a library of available benchmark test procedures.

4. The method of claim 3, wherein the benchmark test procedure comprises a plurality of unit test procedures, and said test result data includes test result data from each of said plurality of unit test procedures.

5. A method comprising:
identifying, by a processor at least a first benchmark test procedure to evaluate at least a first and a second target platform for use with an application, said at least first benchmark test procedure including at least a first unit test;
receiving, by a communication device, test result data from tests performed on said at least first and second target platform using said at least first benchmark test procedure; and
performing, by said processor, a matching analysis to determine which of said at least first and second target platform is a best fit for said application;
wherein the matching analysis by the processor further comprises: grouping said test result data by target platform, by benchmark test, and by unit test;
generating a set of platform placement scores within each benchmark test;
normalizing said set of platform placement scores within each benchmark test; and
generating a set of platform rankings.

6. A processing apparatus, comprising:
a communication device to receive and transmit information via a communication network;
a processor coupled to the communication device; and
a storage device in communication with said processor and storing instructions adapted to be executed by said processor to:
identify at least a first benchmark test procedure to evaluate at least a first and a second target platform for use with an application, said at least first benchmark test procedure including at least a first unit test;
receive test result data from tests performed on said at least first and second target platform using said at least first benchmark test procedure; and
perform a matching analysis to determine which of said at least first and second target platform is a best fit for said application;
wherein said instructions adapted to identify at least a first benchmark test procedure further include instructions to generate an application resource usage profile associated with the application;
wherein said application resource usage profile includes a plurality of canonical forms, each canonical form associated with a relevance weighting;
wherein said plurality of canonical forms include at least one canonical form selected from the group consisting of: multithreaded, networking, floating point, memory intensive, integer intensive, and I/O disk processing.

7. The apparatus of claim 6, wherein said application resource usage profile includes at least one canonical form associated with the application.

8. The apparatus of claim 6, wherein the benchmark test procedure is selected from a library of available benchmark test procedures.

9. The apparatus of claim 8, wherein the benchmark test procedure comprises a plurality of unit test procedures, and said test result data includes test result data from each of said plurality of unit test procedures.

10. A processing apparatus comprising:
a communication device to receive and transmit information via a communication network;
a processor coupled to the communication device; and
a storage device in communication with said processor and storing instructions adapted to be executed by said processor to:
identify at least a first benchmark test procedure to evaluate at least a first and a second target platform for use with an application, said at least first benchmark test procedure including at least a first unit test;
receive test result data from tests performed on said at least first and second target platform using said at least first benchmark test procedure; and
perform a matching analysis to determine which of said at least first and second target platform is a best fit for said application;
wherein said instructions adapted to perform a matching analysis further comprise instructions adapted to:
group said test result data by target platform, by benchmark test, and by unit test;
generate a set of platform placement scores within each benchmark test;
normalize said set of platform placement scores within each benchmark test; and
generate a set of platform rankings.

11. A platform matching system, comprising:
an application resource profile generator to: (i) monitor an application during runtime, (ii) generate data identifying the time spent in resource access system calls, (iii) generate an application resource profile identifying a ratio of time spent in said resource access system calls to the overall application runtime;
a platform analysis system to: (i) identify a set of benchmark tests; (ii) receive benchmark test data associated with one or more target platforms; and (iii) store said benchmark test data; and
a matching system to: (i) receive said application resource profile; (ii) receive said benchmark test data associated with at least a first target platform; (iii) compare said application resource profile with said benchmark test data; and (iv) match said application with at least a first target platform based on said comparison.

12. The platform matching system of claim 11, further comprising:
a monitoring system to: (i) receive production runtime data from a plurality of applications deployed in a production environment; and (ii) store said runtime data for use by said matching system.

13. The method of claim 5, wherein the benchmark test procedure is selected from a library of available benchmark test procedures.

14. The method of claim 13, wherein the benchmark test procedure comprises a plurality of unit test procedures, and said test result data includes test result data from each of said plurality of unit test procedures.

15. The apparatus of claim 10, wherein the benchmark test procedure is selected from a library of available benchmark test procedures.

16. The apparatus of claim 15, wherein the benchmark test procedure comprises a plurality of unit test procedures, and said test result data includes test result data from each of said plurality of unit test procedures.

* * * * *